(12) United States Patent
Bottomley et al.

(10) Patent No.: US 6,426,978 B1
(45) Date of Patent: Jul. 30, 2002

(54) DIGITAL COMMUNICATION SYSTEMS AND METHODS FOR DIFFERENTIAL AND/OR AMPLITUDE ENCODING AND DECODING SECONDARY SYMBOLS

(75) Inventors: Gregory E. Bottomley; Rajaram Ramesh, both of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/164,600

(22) Filed: Oct. 1, 1998

(51) Int. Cl.[7] .............................................. H04L 23/02
(52) U.S. Cl. ................... 375/265; 375/240.24; 341/143
(58) Field of Search ................................. 375/251, 265, 375/261, 262, 296, 308, 316, 329, 341, 343, 141, 219, 240.24, 240.25, 240.27; 714/752, 755, 781, 780, 786, 790, 791, 792, 793, 794, 795; 341/143; 348/410.1

(56) References Cited

U.S. PATENT DOCUMENTS

| | | | | |
|---|---|---|---|---|
| 3,484,782 A | | 12/1969 | Schwidt ....................... 340/348 |
| 5,151,919 A | | 9/1992 | Dent ............................... 375/1 |
| 5,233,630 A | * | 8/1993 | Wolf ............................ 375/308 |
| 5,408,499 A | * | 4/1995 | Sasaki ......................... 375/286 |
| 5,515,396 A | | 5/1996 | Dalekotzin ................... 375/206 |
| 5,596,601 A | * | 1/1997 | Bar-David ................... 375/207 |
| 5,909,462 A | * | 6/1999 | Kamerman et al. ......... 375/206 |
| 6,016,330 A | * | 1/2000 | Ashley et al. ............... 375/341 |
| 6,016,568 A | * | 1/2000 | Wolf et al. .................. 714/792 |
| 6,061,406 A | * | 5/2000 | Carson et al. ............... 375/260 |
| 6,127,971 A | * | 10/2000 | Calderbank et al. ......... 342/368 |
| 6,148,428 A | * | 11/2000 | Welch et al. ................ 714/752 |
| 6,236,685 B1 | * | 5/2001 | Oppedahl .................... 375/265 |
| 6,288,655 B1 | * | 9/2001 | Tsang et al. .................. 341/59 |

FOREIGN PATENT DOCUMENTS

| EP | 0 837 565 A1 | 4/1998 |
|---|---|---|
| EP | 0 949 765 A2 | 10/1999 |

OTHER PUBLICATIONS

Viterbi, *An Intuitive Justification and a Simplified Implementation of the MAP Decoder for Convolutional Codes*, IEEE Journal on Selected Areas in Communications, v. 16, No. 2, Feb. 1998, pp. 260–264.

International Search Report, PCT/US99/18467, Jan. 18, 2000.

* cited by examiner

*Primary Examiner*—Chi Pham
*Assistant Examiner*—Emmanuel Bayard
(74) *Attorney, Agent, or Firm*—Myers Bigel Sibley & Sajovec

(57) ABSTRACT

Digital communication systems and methods combine block encoding and differential and/or amplitude modulation. For every codeword period, one or more additional bits can be transmitted by applying differential modulation and/or amplitude modulation to the codewords. In differential modulation, additional information may be sent by flipping or not flipping the sign of a codeword. In amplitude modulation, additional information may be sent by changing the amplitude of successive codewords. A combination of differential and amplitude encoding may also be used. Thus, the data rate can be increased without increasing the symbol transmission rate.

55 Claims, 2 Drawing Sheets

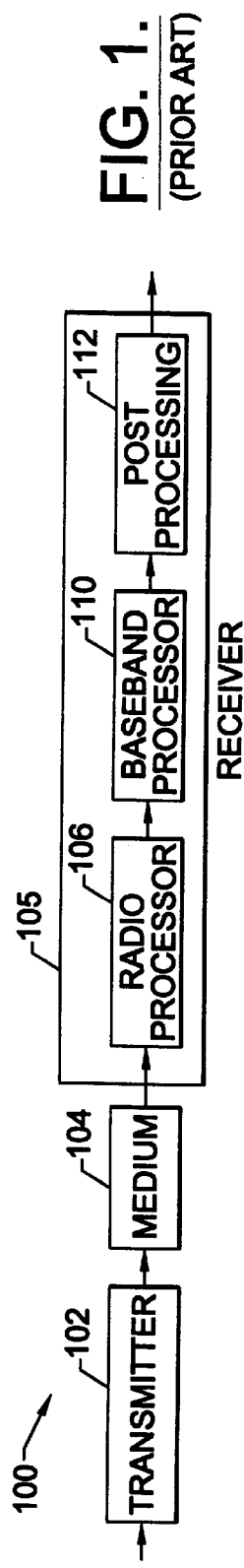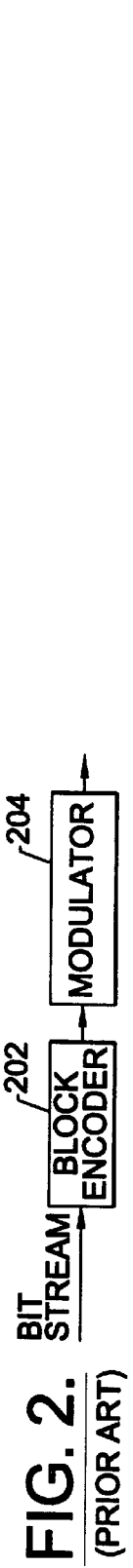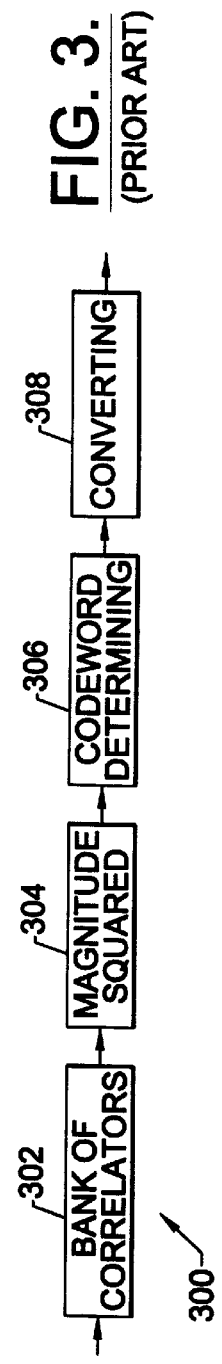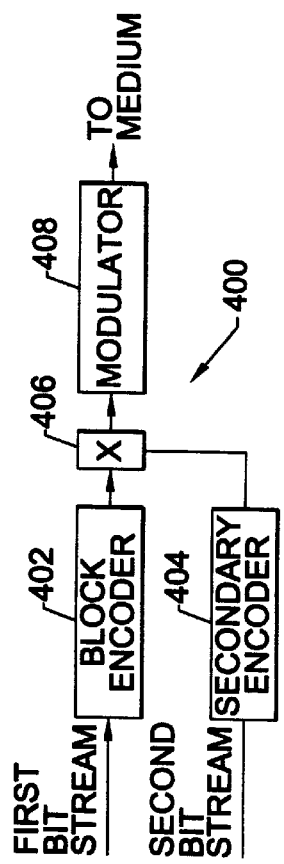
FIG. 1. (PRIOR ART)
FIG. 2. (PRIOR ART)
FIG. 3. (PRIOR ART)
FIG. 4.

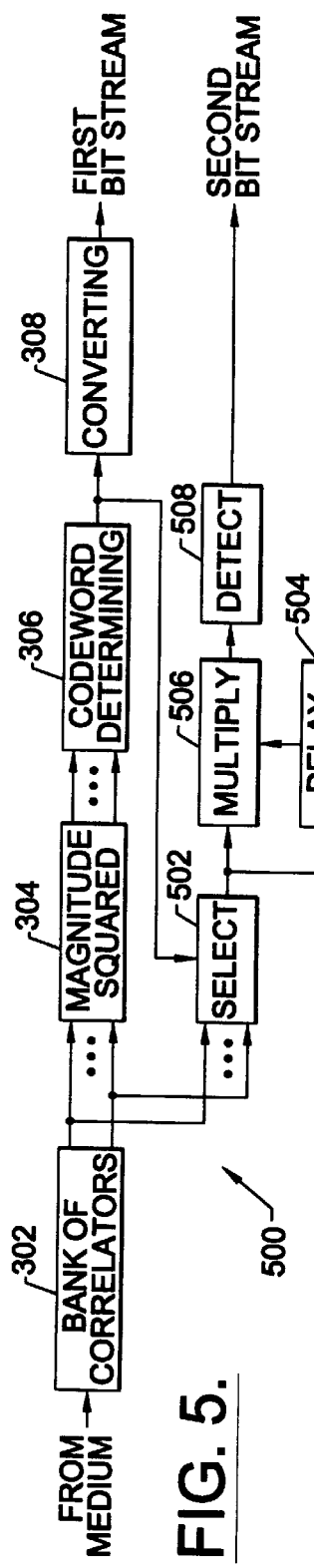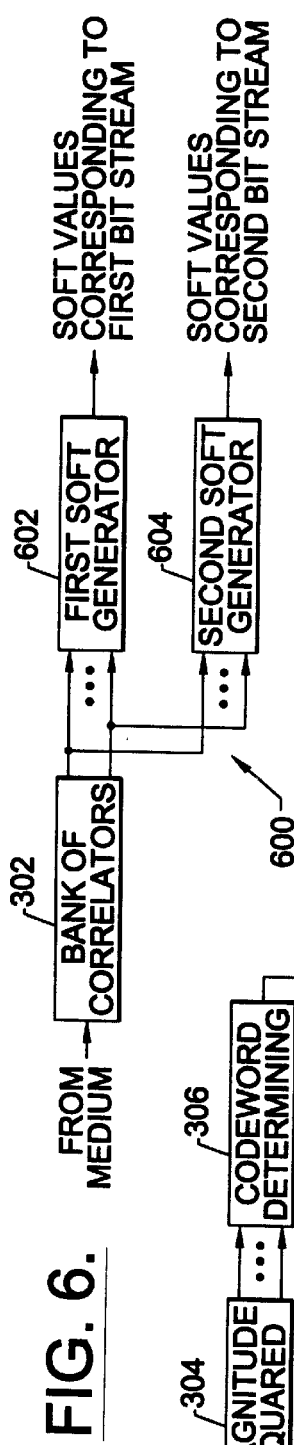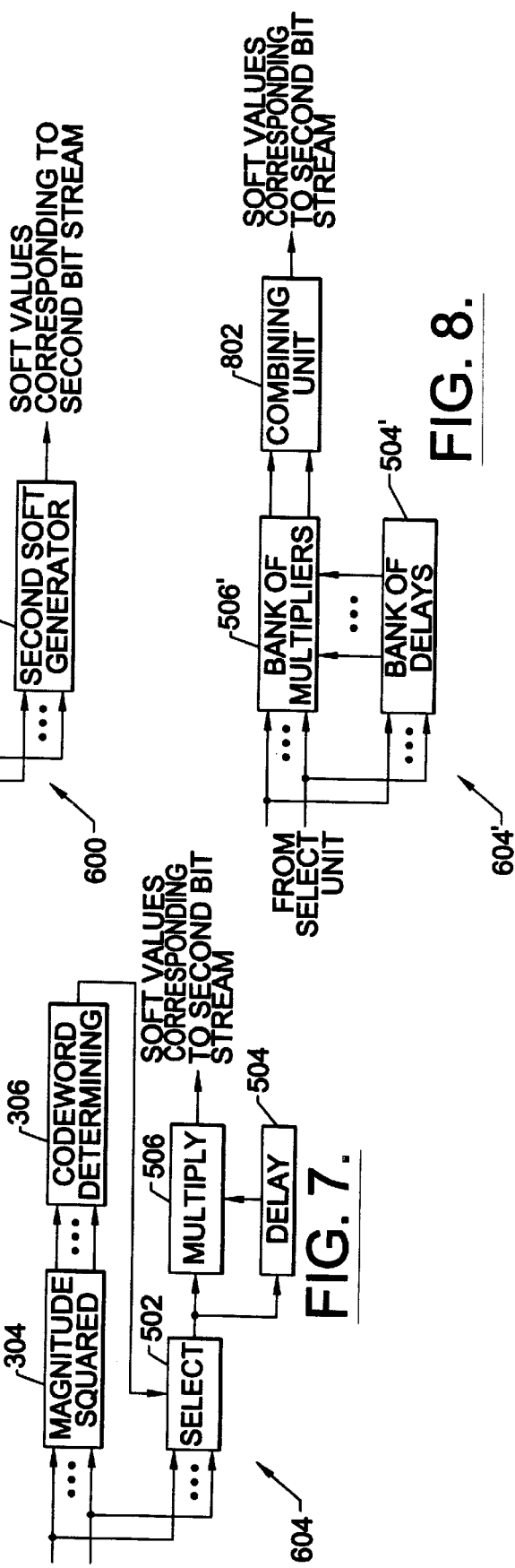

DIGITAL COMMUNICATION SYSTEMS AND METHODS FOR DIFFERENTIAL AND/OR AMPLITUDE ENCODING AND DECODING SECONDARY SYMBOLS

FIELD OF THE INVENTION

This invention relates to digital communication systems and methods and more specifically to transmission and reception of coded digital bit streams.

BACKGROUND OF THE INVENTION

Digital bit streams are transmitted and received in many digital communication systems including but not limited to data storage systems and wireless and wired data communication systems. As the capacity and utilization of these systems continues to increase, it is generally desirable to transmit bit streams at higher data rates. Higher data rates may be obtained by operating the systems more rapidly. However, it is also desirable to increase data rates by coding more information into a bit stream.

The need for higher data rates will now be explained for wireless communications including but not limited to wireless radiotelephone communication systems and methods. Wireless communications continue to expand as more radio spectrum becomes available for commercial use and as cellular radiotelephones become commonplace. In addition, there is currently an evolution from analog communications to digital communications. Speech is represented by a series of bits, which are modulated and transmitted from a base station to a radiotelephone. The radiotelephone demodulates the received waveform to recover the bits, which are then converted back into speech. There is also a growing demand for data services, such as e-mail and Internet access, which generally use digital communications.

There are many types of wireless digital communication systems and methods. Traditionally, Frequency-Division-Multiple-Access (FDMA) is used to divide the spectrum into a plurality of radio channels corresponding to different carrier frequencies. These carrier frequencies may be further divided into time slots, referred to as Time-Division-Multiple-Access (TDMA), as is the case in the D-AMPS, PDC, and GSM digital cellular radiotelephone systems. Alternatively, multiple users can use the same bandwidth using spread spectrum techniques such as Code-Division-Multiple-Access (CDMA). IS-95 and J-STD-008 are examples of CDMA standards.

Regardless of the modulation and multiple access methods used, the system design should efficiently use the limited available radio spectrum. Thus, there continues to be a need to efficiently send as many bits of information as possible through the radio channel with a given quality.

Higher data rates may be achieved using many approaches, which may apply to FDMA, TDMA, and CDMA systems. One approach is to trade data rate for accuracy. For example, by reducing forward error correcting encoding rates or spreading factors, higher data rates may be achieved at the expense of increased bit error or frame error. Also, higher order modulation can be used.

A second approach is to trade data rate for user capacity. This approach gives a user more "channels," i.e., more FDMA carriers, more TDMA time slots, or more CDMA codes. This may increase the data rate of one user, but may leave fewer channels available for other users.

Both of these approaches may involve trade-offs. Accordingly, it is desirable to allow an increase in data rate without the need to increase the symbol transmission rate.

SUMMARY OF THE INVENTION

It is therefore an object of the present invention to provide improved digital communication systems and methods.

It is another object of the present invention to provide digital communication systems and methods that can increase the amount of information that is encoded in a bit stream without the need to increase the symbol transmission rate.

These and other objects are provided according to the present invention by combining block encoding and differential and/or amplitude modulation. Conventional block encoded systems and methods send one of N codewords to transmit m=log$_2$ (N) bits. According to the invention, for every codeword period, one or more additional bits can be transmitted by applying differential modulation and/or amplitude modulation to the codewords. In differential modulation, additional information may be sent by flipping or not flipping the sign of a codeword. In amplitude modulation, additional information may be sent by changing the amplitude of successive codewords. A combination of differential and amplitude encoding may also be used. Thus, the data rate can be increased without increasing the symbol transmission rate.

More specifically, transmitters and transmitting methods according to the invention transmit a first bit stream and a second bit stream by block encoding the first bit stream to produce codewords. The second bit stream is differential and/or amplitude encoded by a second encoder that uses at least one of differential and amplitude encoding to produce secondary symbols. The secondary symbols are modulated onto the codewords to produce modified codewords. A carrier wave is then modulated according to the modified codewords. Thus, each codeword can include supplementary information thereon that is generated by the differential and/or amplitude encoding of the second bit stream.

The first bit stream may be block encoded using an orthogonal code, Nordstrom-Robinson code, Reed-Muller code or Kerdock code. Differential encoding may be provided by performing at least one EXCLUSIVE-OR operation on the secondary symbols and the codewords. Many forms of modulation may be used including direct sequence spreading and offset QPSK modulation.

Propagated signals according to the invention include a first bit stream and a second bit stream embodied in a carrier wave. The first bit stream and the second bit stream are embodied in a carrier wave by a plurality of codewords that are modulated on the carrier wave. The codewords comprise a block encoding of the first bit stream with differential and/or amplitude encoding of the second bit stream modulated thereon.

Receivers and receiving methods according to the present invention correlate a bit stream to a set of codewords to produce correlations. The highest correlations are detected to thereby detect codewords that correspond to the bit stream. The sign and/or amplitude changes in the correlations corresponding to the detected codewords are also detected to thereby detect differential and/or amplitude encoded secondary symbols in the bit stream.

The highest correlations may be detected using a soft decision block code detector or a hard decision block code detector. Sign and/or amplitude changes may also be detected using a soft decision differential and/or amplitude detector or a hard decision differential and/or amplitude detector. The highest correlations may be detected by squaring the magnitude of the correlations. The sign and/or amplitude changes in the correlations may be detected by delaying a correlation corresponding to a detected codeword and multiplying the delayed correlation with a current correlation to detect differentially encoded secondary symbols in the bit stream.

Transmitters and receivers as described above may be combined to provide digital communication systems. Transmitting and receiving methods as described above may be combined to provide digital communication methods. Accordingly, additional bits may be transmitted and received in each codeword period to thereby allow an increase in data rate without the need to increase the symbol transmission rate.

BRIEF DESCRIPTION OF THE DRAWINGS

FIG. 1 is a block diagram of a conventional digital communication system.

FIG. 2 is a block diagram of a conventional modulator for the system of FIG. 1.

FIG. 3 is a block diagram of a conventional demodulator for the system of FIG. 1.

FIG. 4 is a block diagram of transmitters and transmitting methods according to the present invention.

FIG. 5 is a block diagram of receivers and receiving methods according to the present invention.

FIG. 6 is a block diagram of soft generator receivers and receiving methods according to the present invention.

FIG. 7 is a block diagram of a first embodiment of second soft generator receivers and receiving methods according to the present invention.

FIG. 8 is a block diagram of a second embodiment of second soft generator receivers and receiving methods according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For wireless communications, a transmitter emits electromagnetic waveforms from an antenna, the medium is the radio propagation environment, and a receiver employs one or more antennas to recover the transmitted signal. While the following embodiments are described in the context of radio communications, the invention is not limited to such systems and methods. It is also applicable to other digital communication environments including wire communications and magnetic storage systems. In such applications a radio processor may be generalized to a device that extracts data from a transmission or storage medium.

The invention will be described in the context of a spread-spectrum, linearly modulated signal, such as the IS-95 CDMA uplink. However, the invention is not limited to such systems and methods, as it is also applicable to other forms of modulation, including direct sequence spreading.

A conventional digital communications system 100 is shown in FIG. 1. Digital symbols are provided to a transmitter 102, which maps the symbols into a representation appropriate for the transmission medium 104 such as a radio channel. The transmitted signal passes through the medium 104 and is received at a receiver 105. The receiver 105 includes a radio processor 106, a baseband signal processor 110, and a post processing unit 112.

The radio processor 106 tunes to the desired band and desired carrier frequency, and amplifies, mixes and filters the signal down to baseband. The signal is sampled and quantized, ultimately providing a sequence of baseband received samples. Since the original radio signal has in-phase (I) and quadrature (Q) components, the baseband samples may also have I and Q components, giving rise to complex baseband samples.

The baseband processor 110 is used to detect the digital symbols that were transmitted. It may produce soft information as well, which gives information regarding the likelihood of the detected symbol values.

The post processing unit 112 performs functions that may depend highly on the particular communications application. For example, it may use the soft detected values to perform forward error correction decoding or error detection decoding. It may convert digital symbols into speech using a speech decoder.

In the transmitter 102, bits are encoded and modulated prior to transmission. A conventional modulator 200 that can be part of the transmitter 102 of FIG. 1 is illustrated in FIG. 2. Bits are provided to a block encoder 202, which takes groups of m input bits and produces N coded bits or "chips," which together form a codeword. For example, the bits may be in Boolean form (0 or 1) and the codeword chips may be in signed form (+1 or −1). The chips are then provided to a modulator 204, which applies the necessary pulse shaping and frequency translation to prepare the signal for transmission from an antenna. For example, the IS-95 uplink modulation includes a factor of four spreading, scrambling by a complex spreading sequence, and offset-QPSK modulation.

At the baseband processor 110 of the receiver 105, as illustrated in FIG. 1, demodulation may be performed. A conventional demodulator 300 that can be part of the receiver 105 of FIG. 1, is illustrated in FIG. 3. The demodulator 300 receives complex samples, corresponding to in-phase (I) and quadrature (Q) signal components. BPSK modulation and a sampling rate of 1 sample per chip are assumed for illustration purposes. The bank of correlators 302 correlate L complex samples with the N different codeword patterns, producing N complex correlation values. These correlation values are provided to a magnitude squared unit 304, which computes the magnitude squared of each complex value, i.e., the real part squared plus the imaginary part squared. The magnitude squared values are provided to a codeword determining unit 306, which determines the codeword whose corresponding magnitude squared value was the largest. The codeword determining unit 306 provides the index of the codeword thus detected to a converting unit 308, which produces the bit values corresponding to that codeword. Thus, the magnitude squared unit 304 and the codeword determining unit 306 provide an embodiment of a block code detector that detects the highest correlations to thereby detect codewords that correspond to the bit stream.

As described above, the magnitude squared of the correlations is used. Thus, phase rotation at the transmitter may have no impact on performance. With the present invention, this property is exploited to provide phase modulation in addition to block encoding to enable transmission of a second information stream. Similarly, amplitude variation among codewords that are constant amplitude within a codeword period, need not impede recovery of the bits, although it may change the signal-to-noise ratio for that codeword period.

When phase modulation is used according to the invention, differential encoding of the second information stream is used. This allows detection without the need for a coherent reference. Bi-orthogonal encoding exists, in which orthogonal block encoding is used to send some bits and an additional bit is sent by sending the codeword or its negative. However, such an approach may require a coherent reference at the receiver.

The invention can also use amplitude modulation, with or without differential encoding. Then, a semi-coherent receiver may be needed, as amplitude changes are detected at the receiver. A phase reference may not be needed. Both amplitude and differential phase modulation can be used. Also, if amplitude modulation is used, coherent phase modulation may be used, but a fully coherent receiver may be needed.

A transmitter 400 according to the present invention is illustrated in FIG. 4. A first bit stream is proved to a block encoder 402, producing codewords or chips. A second bit stream is provided to a secondary encoder 404, producing one secondary symbol every code period of block encoder 402. The secondary encoder 404 can be either a differential encoder (e.g., DPSK, DQPSK), an amplitude encoder (e.g., ASK), or a differential amplitude encoder. Thus, is can produce either real or complex secondary symbols. A first modulator such as a multiplier 406 is provided, wherein each chip of a block codeword is multiplied by the same secondary symbol, producing modified chips or modified codewords. These modified chips are modulated onto a carrier wave by a second modulator 408. The carrier wave may be wireless or wired.

In one example, the secondary encoder 404 is based on DPSK. It produces +1 or −1, depending on whether successive bits in the second bit stream are the same or differ. For this example, the multiplier 406 effectively flips the sign of the codeword chips, depending on the output of the secondary encoder 404. This secondary encoding may be used in the IS-95 uplink to send an additional bit every codeword period. The second modulator 408 may then be based on the IS-95 uplink modulation (spreading, scrambling, and O-QPSK modulation).

Specific implementations will generally depend on the modulation that is used. For example, as described above, the block encoder 402 and the secondary encoder 404 may be designed to produce Boolean logic values (0 and 1) instead of +1 and −1 values. Then, the multiplier 406 may be implemented as an EXCLUSIVE-OR device. The modulator 408 may take the Boolean logic values and convert them to +1 or −1 values.

For a secondary encoder 404 based on DQPSK, the encoder can produce complex secondary symbols, which may be represented with binary index values. For example, 00 for 1+j, 01 for −1+j, 11 for −1−j, and 10 for 1−j may be used. In this case, the multiplier 406 may take Boolean logic values from both the block encoder 402 and the secondary encoder 404. It may then use logic or a table lookup to produce modified chips represented by two Boolean logic values. These two values may be the secondary symbol values or opposites, depending on the chip values. Thus, if the block encoder output chip value is a 1 and the secondary symbol value is 00, then the modified chip value would be 11, implying that the modulator should transmit the −1−j QPSK or offset QPSK symbol.

A receiver 500 according to the present invention is illustrated in FIG. 5, for the case of differential phase modulation of the second bit stream. The receiver 500 may include a conventional bank of correlators 302, a magnitude squared unit 304, a codeword determining unit 306 and a converting unit 308 as was already described in FIG. 3, to demodulate the first bit stream that was block encoded. In addition, complex correlation values from the bank of correlators 302 are provided to a select unit 502, which selects one of the N complex values corresponding to the detected codeword index which is provided by the codeword determining unit 306. The selected correlation is delayed one codeword period in a delay unit 504, which produces a delayed selection correlation. The selected correlation from the select unit 502 and the delayed selected correlation from the delay unit 504 are provided to a multiply unit 506, which produces the product of the selected correlation unit with the complex conjugate of the delayed selected correlation. If the secondary encoder is based on DPSK, then only the real part of the product is produced. The product is provided to a detector 508, which determines the second bit stream values from the product. For example, for DPSK based mapping, the detector 508 takes the sign of the product. For π/4-shift DQPSK based mapping, the sign of the real and imaginary parts of the product give the two bits sent in one codeword period. Thus, the select unit 502, the multiply unit 506, the delay unit 504 and the detect unit 508 provide an embodiment of a differential detector that detects sign changes in the correlations corresponding to the detected codewords, to thereby detect differential encoded secondary symbols in the bit stream.

The receiver 500 produces "hard" bit values. Often, demodulation is followed by deinterleaving and decoding. For this situation, it is preferable to produce "soft" values, whose amplitude is indicative of the confidence of the detected bit value being correct. A soft receiver 600 according to the present invention is illustrated in FIG. 6. Complex samples are provided to the bank of correlators 302, producing complex correlations. These correlations are provided to a first soft generator 602, which produce soft values corresponding to the block encoded first bit stream. The correlations are also provided to a second soft generator 604, which produces soft values corresponding to the second bit stream.

For the first soft generator 602, conventional approaches can be used, such as those described in A. J. Viterbi, "An Intuitive Justification and a Simplified Implementation of the MAP Decoder for Convolutional Codes," *IEEE J. Sel. Areas Commun.*, Vol. 16, pp. 260–264, February 1998, the disclosure of which is incorporated herein by reference. For example, for each bit, the difference between the largest correlation corresponding to a codeword with the bit equal to +1 and the largest correlation corresponding to a codeword with the bit equal to −1 may be used. Alternatively, the magnitude or the magnitude squared correlation value associated with the largest correlation may be used as the soft value amplitude for all the bits represented by that codeword.

An embodiment of second soft generator 604 is illustrated in FIG. 7. Complex correlation values are provided to the magnitude squared unit 304, which computes the magnitude squared of each complex value. The magnitude squared values are provided to the codeword determining unit 306, which determines the codeword whose corresponding magnitude squared value was the largest. The codeword determining unit 306 produces the index of the codeword thus detected to the select unit 502. The select unit 502 uses the codeword index to select one of the complex correlation values, producing a selected correlation value. The selected correlation is delayed one codeword period in the delay unit 504, which produces a delayed selected correlation. The selected correlation from the select unit 502 and the delayed selected correlation from the delay unit 504 are provided to the multiply unit 506, which produces the product of the selected correlation unit with the complex conjugate of the delayed selected correlation. If the secondary encoder is based on DPSK, then only the real part of the product need be produced. The real and possibly imaginary parts of the product provide soft information regarding the secondary bit stream.

Optimal detection and/or soft information generation for the second bit stream may be based on Maximum A Posteriori (MAP) detection. Specifically, for a particular bit, the likelihood or loglikelihood of the bit being a +1 is compared with the likelihood or loglikelihood of the bit being a −1, given the received data samples. For detection, whichever likelihood or loglikelihood is larger provides the detected bit. For soft information generation, the likelihood ratio, or preferably the difference of loglikelihoods, may provide the soft information for a soft decoder.

Thus, a preferred soft information generator, which can also be used for detection, can compute a quantity related to the loglikelihood that the bit is a +1, denoted $A_+$, and a quantity related to the loglikelihood that the bit is a −1, denoted $A_-$. For detection, the quantities can be proportional to likelihoods or loglikelihoods. It is assumed that for both first and second bit streams, the bits are independent and equally likely to be +1 or −1.

The likelihood that a second stream bit is a certain value can be expressed as the sum of likelihoods, summed over all possible combinations of all possible current period codewords with all possible previous period codewords. While the true likelihood for differential detection of differential symbols may not be known, an approximate form may be given by:

$$P\{d = D_p\} = \exp\left[\frac{\text{Re}\{zD_p^*\}}{2P_N}\right];$$

where d is the differential symbol (representing one or more bits), $D_P$ is the pth possible differential symbol, exp is the exponentiation function, Re{a} denotes taking the real part of a, z is the differential detection output, i.e., the product described above, $P_N$ is the noise power on the values used to form products, and the superscript "*" denotes complex conjugation.

For differential mapping based on DPSK, the differential symbol d corresponds to the secondary bit. A loglikelihood may be obtained by forming z, i.e., the product of a codeword correlation with the conjugate of a previous period codeword correlation, for all possible combinations. With N possible codewords, this may provide $N^2$ combinations. For each combination, the likelihood may be evaluated. The likelihoods corresponding to + may be summed, and the log of that result taken. Similarly, the likelihoods corresponding to − may be summed, and the log of the result taken. The difference of the two log values may provide the soft value for the differential bit. Forming likelihood functions may require magnitude, magnitude squared, exponentiation, logarithms and Bessel function operations as is known in the art.

It will be understood that the likelihood function may require knowledge of the noise power (or twice the noise power). One solution to this is to set this value to an operating point value or worst case value, so that it is a design parameter that is fixed. Another solution is to adaptively estimate the noise power. For example, in a system with known synchronization symbols, channel estimation can be used and the signal component can be subtracted from the received samples, allowing noise power to be estimated using the magnitude squared of the residuals.

For DQPSK, there are four possible symbol values, as two differential bits are sent in one differential symbol. For each differential bit, there are two DQPSK symbols associated with + and two associated with −. Thus, when forming $A_+$, there may be $N^2/2$ terms in the summation, $N^2/4$ associated with one of the differential symbol values and $N^2/4$ associated with the other. The same may be true for $A_-$.

An alternative embodiment of a second soft generator 604', based on the semi-optimal approach just described, is illustrated in FIG. 8. Complex correlations are supplied to a bank of delays 504', which delays these correlations by one codeword period, producing delayed correlations. Correlations and delayed complex correlations are supplied to a bank of multipliers 506', which compute the product of a correlation with the conjugate of a delayed correlation for all possible correlation and delayed correlation values. These products are provided to a combining unit 802, which determines soft information for each differential bit using the products. If only detection is needed, then the combining unit 802 can produce hard bit values only.

Suboptimal approaches can be obtained by discarding smaller terms in the summations. For example, keeping only the dominant term in each summation leads to the structure in FIG. 7.

In summary, the magnitude squared unit 304, the codeword determining unit 306 and the converting unit 308 can provide a hard decision correlation-based block code detector. The first soft generator 602 is an example of a soft decision correlation-based block code detector.

Similarly, the delay unit 504 and the multiply unit 506 together can provide a soft decision correlation-based differential detector. By adding the detector 508, a hard decision correlation-based differential detector can be provided. Also, the second soft generator 604 is an example of a soft decision correlation-based differential detector. Other forms of differential detection may be used, such as taking a difference of phase values. While examples were given with hard decision decoding used for both bit streams or soft decision decoding used for both bit streams, it is also possible to provide a combination of soft and hard decision decoding.

The following Examples illustrate transmitting and receiving conventional bit streams and bit streams according to the present invention. These examples are merely illustrative and shall not be viewed as limiting the present invention.

EXAMPLE 1

An example of conventional transmitting and receiving of a first bit stream using block encoding will now be described. For the purposes of the example, a Walsh-Hadamard (4,2) code will be used. In order to provide a simplified example, it will be assumed that only two information bits are being sent, and that these two information bits are coded into one of four codewords (CW). Table 1 illustrates the information bits, codeword numbers and the actual codewords that are sent over the transmission medium. To simplify notation, "+" refers to +1 and "–" refers to –1

TABLE 1

| Information Bits | Codeword (CW) Number | Codeword (CW) Transmitted |
|---|---|---|
| 00 | 0 | ++++ |
| 01 | 1 | +–+– |
| 10 | 2 | ++–– |
| 11 | 3 | +––+ |

Assume that the information bits 00 and 01 are transmitted. According to the Walsh-Hadamard (4,2) code described in Table 1, the following bit stream will be sent:

+++++–+–

Upon receiving the bit stream, a correlation is performed. In performing the correlation, the received bit stream is multiplied by each of the possible codewords. The magnitude squared is determined, and the codeword corresponding to the largest magnitude squared is determined to be the detected codeword. The correlation is illustrated in Table 2.

TABLE 2

| Correlation (Magnitude)$^2$ | Received Bitstream | |
|---|---|---|
| | ++++ | +–+– |
| CW0 ++++ | 4 (16) | 0 (0) |
| CW1 +–+– | 0 (0) | 4 (16) |
| CW2 ++–– | 0 (0) | 0 (0) |
| CW3 +––+ | 0 (0) | 0 (0) |

The magnitude squared is shown in parentheses after the individual correlations. Thus, as shown in Table 2, codewords 0 and 1 are sequentially detected, corresponding to information bits 00 and 01.

EXAMPLE 2

Example 2 illustrates transmission and reception of first and second bit streams according to the present invention using the same parameters as in Example 1. In Example 2, the same first bit stream of 00 and 01 as in Example 1 is transmitted. However, a secondary symbol of –1 will also be transmitted. The –1 symbol is transmitted by flipping the sign of the second codeword. Thus, in order to send the first bit stream 00 and 01 corresponding to codewords ++++ and +–+–, with the second bit stream of –1 modulated thereon, the sign of the second codeword is flipped so that the modified codewords ++++ and –+–+ are transmitted.

Table 3 illustrates the received bit stream, the result of the correlation and the result of obtaining the magnitude squared. As shown, for the first modified codeword, correlation and magnitude squared is the same as Table 2. However, for the second modified codeword, correlation yields –4 for CW1. When the magnitude is squared, 16 is obtained, which is the same as Table 2. Thus, CW1 is detected in the same manner as Table 2.

TABLE 3

| Correlation (Magnitude)$^2$ | Received Bitstream | |
|---|---|---|
| | ++++ | +–+– |
| CW0 ++++ | 4 (16) | 0 (0) |
| CW1 +–+– | 0 (0) | –4 (16) |
| CW2 ++–– | 0 (0) | 0 (0) |
| CW3 +––+ | 0 (0) | 0 (0) |

In order to detect the second bit stream, the sign changes and the correlations corresponding to the detected codewords are detected to thereby detect the differential encoded secondary symbols in the bit stream. For the example of Table 3, the new bit is detected by using the relationship.

Sign{–4,+4}=–1

Thus, the secondary symbol of –1 has been detected.

EXAMPLE 3

An example of amplitude encoded secondary symbols will now be described. In order to amplitude encode the secondary symbols, each codeword is sent at one of two amplitude levels. Assume that the amplitude levels are arbitrarily designated as 1 and 2. In order to send a secondary bit stream 01, the amplitude of the first codeword is sent at the 1 level and the amplitude of the second codeword is sent at the 2 level. Table 4 illustrates the received bit stream, the correlation and magnitude squared operations.

TABLE 4

| Correlation (Magnitude)$^2$ | Received Bitstream | |
|---|---|---|
| | +1+1+1+1 | +2–2+2–2 |
| CW0 +1+1+1+1 | 4 (16) | 0 (0) |
| CW1 +1–1+1–1 | 0 (0) | 8 (64) |
| CW2 +1+1–1–1 | 0 (0) | 0 (0) |
| CW3 +1–1–1+1 | 0 (0) | 0 (0) |

As shown in Table 4, the result of the correlation and magnitude square operations will detect CW0 and CW1. In order to detect the secondary bit stream, the amplitude of the magnitude squared of the detected codewords is compared against a threshold. For example, a threshold of 32 may be used in Example 3. For the first codeword, the magnitude squared of 16 is less than the threshold of 32 so that a secondary bit stream value of 0 is detected. For the second codeword the magnitude squared of 64 is greater than the threshold of 32, so a secondary bit stream value of 1 is detected. Thus, the secondary bit stream 01 is detected.

In Examples 2 and 3 according to the invention, the same number of bits were transmitted and received but a second bit stream was detected in addition to the first bit stream. Accordingly, higher bit rates may be obtained without requiring additional bits. Moreover, existing codeword modulation schemes may be used with the secondary bit stream impressed thereon. Combinations of differential and amplitude encoding of Examples 2 and 3 may also be used.

EXAMPLE 4

In the IS-95 uplink, orthogonal modulation with noncoherent detection is used. Six bits are used to select which of 64 orthogonal Walsh codewords to transmit. At the receiver, correlations to all 64 possible codewords are performed. The correlation that is the largest in magnitude is selected. To expand the data rate according to the invention, differential and/or amplitude modulation is added to the orthogonally modulated signal. For example, the sign of the codeword sent is differentially modulated to provide an additional information signal. The bit rate of the secondary symbols can be equal to the code block transmission rates. This additional modulation need not effect the modulation performance of the block encoded bits, since noncoherent reception may be employed.

Assume the original orthogonally modulated systems sends the sequence of codewords $W_1 W_{33} W_6 \ldots$ If an additional bit stream of 10 is desired to be sent, this bit stream can be differentially encoded to +1−1−1 where "1" is mapped to "change sign" "0" is mapped into "do not change sign." This differential bit stream can be impressed on the sequence of codewords to provide $W_1 - W_{33} - W_6 \ldots$ Alternatively, the additional bit stream can be amplitude encoded to +2+1 where "1 " is mapped to "+2" and "0" is mapped into "+1." This differential bit stream can be impressed on the sequence of codewords giving $+2W_1 + 1W_{33}$. Combinations of differential and amplitude encoding may also be provided.

The present invention may be applicable to any block code which can be detected noncoherently, i.e., whose codeword set does not include or is restricted to not include codewords and rotations of codewords. For example, orthogonal block encoding using Walsh-Hadamard codes may be used. For this block code, the bank of correlators 302 can be efficiently implemented using a fast Walsh transform circuit. Thus, in general, the bank of correlators may be a correlation device for computing correlations of received samples to codewords. Other block codes, such as Nordstrom-Robinson, second-order Reed Muller and Kerdock codes may be used. Codes with antipodal components removed may also be used. For example, convolutional encoding of a block of bits that are differently encoded may be used.

The present invention may also be used in conjunction with Rake reception. The bank of correlators 302 may produce more than one correlation for each codeword in each codeword period. The magnitude squared unit 304 may compute magnitude squared values for each correlation and then sum magnitude squared values corresponding to rays or echoes of a particular codeword in a particular codeword period. Thus, the detected codeword, determined in the codeword determining unit 406, may be based on sums of magnitude squared values. The select unit 502 may pass all correlations corresponding to the detected codeword in a particular codeword period. Differential detection may be applied to each signal image or ray using the multiply unit 506 and the delay unit 504. The resulting products may then be summed at the output of the multiply unit 506 in FIGS. 5 and 7.

If interference between codeword periods is significant, or interference between multiple users is significant, then interference cancellation may be used. For example, energy associated with detected codewords may be subtracted or nulled from the received samples, as discussed in U.S. Pat. No. 5,151,919 to Dent, the disclosure of which is incorporated herein in its entirety by reference.

If amplitude modulation is also used, then additional processing may be used at the receiver to detect a change in amplitude. For example, the magnitude squared value corresponding to the detected codeword may be compared to the previous value. If the ratio or difference exceeds a threshold, then an amplitude change may be detected.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A transmitter that transmits a first bit stream and a second bit stream, the transmitter comprising:
    a block encoder that encodes the first bit stream to produce codewords based on the first bit stream;
    a differential and/or amplitude encoder that produces secondary symbols based on the second bit stream;
    a first modulator that modulates the codewords according to the secondary symbols to produce modified codewords; and
    a second modulator that modulates a carrier wave according to the modified codewords.

2. A transmitter according to claim 1 wherein the block encoder comprises a block encoder that encodes the first bit stream using an orthogonal code.

3. A transmitter according to claim 1 wherein the block encoder comprises a block encoder that encodes the first bit stream using at least one of Nordstrom-Robinson, Reed Muller and Kerdock codes.

4. A transmitter according to claim 1 wherein the differential and/or amplitude encoder is a differential encoder.

5. A transmitter according to claim 1 wherein the second modulator modulates a carrier wave according to the modified codewords using at least one of direct-sequence spreading and offset QPSK modulation.

6. A transmitter that transmits a first bit stream and a second bit stream, the transmitter comprising:
    means for block encoding the first bit stream to produce codewords;
    means for differential and/or amplitude encoding the second bit stream to produce secondary symbols;
    means for modulating the codewords according to the secondary symbols to produce modified codewords; and
    means for modulating a carrier wave according to the modified codewords.

7. A transmitter according to claim 6 wherein the means for block encoding comprises means for block encoding the first bit stream using an orthogonal code.

8. A transmitter according to claim 6 wherein the means for block encoding comprises means for block encoding the first bit stream using at least one of Nordstrom-Robinson, Reed Muller and Kerdock codes.

9. A transmitter according to claim 6 wherein the means for differential and/or amplitude encoding is a differential encoder.

10. A transmitter according to claim 6 wherein the means for modulating a carrier wave comprises means for modulating a carrier wave according to the modified codewords using at least one of direct-sequence spreading and offset QPSK modulation.

11. A method of transmitting a first bit stream and a second bit stream comprising the steps of:
    block encoding the first bit stream to produce codewords;
    differential and/or amplitude encoding the second bit stream to produce secondary symbols;
    modulating the codewords according to the secondary symbols to produce modified codewords; and
    modulating a carrier wave according to the modified codewords.

12. A method according to claim 11 wherein the step of block encoding comprises the step of block encoding the first bit stream using an orthogonal code.

13. A method according to claim 11 wherein the step of block encoding comprises the step of block encoding the first bit stream using at least one of Nordstrom-Robinson, Reed Muller and Kerdock codes.

14. A method according to claim 11 wherein the differential and/or amplitude encoding step comprises the step of differential encoding.

15. A method according to claim 11 wherein the step of modulating a carrier wave comprises the step of modulating a carrier wave according to the modified codewords using at least one of direct-sequence spreading and offset QPSK modulation.

16. A data signal embodied in a carrier wave comprising:
a plurality of codewords that are modulated on the carrier wave, the codewords comprising a block encoding of a first bit stream with differential and/or amplitude encoding of a second bit stream modulated thereon.

17. A data signal embodied in a carrier wave according to claim 16 wherein the block encoding comprises an orthogonal block encoding.

18. A data signal embodied in a carrier wave according to claim 16 wherein the block encoding comprises at least one of Nordstrom-Robinson, Reed Muller and Kerdock block encoding.

19. A data signal embodied in a carrier wave according to claim 16 wherein the codewords are modulated on a carrier wave using at least one of direct-sequence spreading and offset QPSK modulation.

20. A receiver that receives a data stream, the receiver comprising:
a correlator that correlates the data stream to a set of codewords to produce correlations;
a block code detector that detects codewords that correspond to the data stream; and
a differential and/or amplitude detector that detects sign and/or amplitude changes in the correlations to thereby detect differential and/or amplitude encoded secondary symbols in the data stream.

21. A receiver according to claim 20 wherein the block code detector comprises a soft decision block code detector or a hard decision block code detector and wherein the differential and/or amplitude detector comprises a soft decision differential and/or amplitude detector or a hard decision differential and/or amplitude detector.

22. A receiver according to claim 20 wherein the block code detector detects the highest correlations to thereby detect the codewords that correspond to the data stream.

23. A receiver according to claim 20 wherein the differential and/or amplitude detector comprises:
a delay unit that delays a correlation corresponding to a detected codeword; and
a multiplier that multiplies the complex conjugate of the delayed correlation with a current correlation to detect differentially encoded secondary symbols in the data stream.

24. A receiver that receives a data stream, the receiver comprising:
means for correlating the data stream to a set of codewords to produce correlations;
first means for detecting codewords that correspond to the data stream; and
second means for detecting sign and/or amplitude changes in the correlations to thereby detect differential and/or amplitude encoded secondary symbols in the data stream.

25. A receiver according to claim 24 wherein the first means for detecting comprises a soft decision block code detector or a hard decision block code detector and wherein the second means for detecting comprises a soft decision differential and/or amplitude detector or a hard decision differential and/or amplitude detector.

26. A receiver according to claim 24 wherein the first means for detecting comprises means for detecting the highest correlations to thereby detect the codewords that correspond to the data stream.

27. A receiver according to claim 24 wherein the second means for detecting comprises:
means for delaying a correlation corresponding to a detected codeword; and
means for multiplying the complex conjugate of the delayed correlation with a current correlation to detect differentially encoded secondary symbols in the data stream.

28. A method of receiving a data stream comprising the steps of:
correlating the data stream to a set of codewords to produce correlations;
detecting codewords that correspond to the data stream; and
detecting sign and/or amplitude changes in the correlations to thereby detect differential and/or amplitude encoded secondary symbols in the data stream.

29. A method according to claim 28 wherein the step of detecting codewords comprises the step of soft decision or hard decision detecting the codewords and wherein the step of detecting sign and/or amplitude changes comprises the step of soft detecting or hard detecting sign and/or amplitude changes.

30. A method according to claim 28 wherein the step of detecting the codewords comprises the step of detecting the highest correlations to thereby detect codewords that correspond to the data stream.

31. A method according to claim 28 wherein the step of detecting sign and/or amplitude changes comprises the steps of:
delaying a correlation corresponding to a detected codeword; and
multiplying the complex conjugate of the delayed correlation with a current correlation to detect differentially encoded secondary symbols in the data stream.

32. A digital communication system comprising:
a block encoder that encodes a first bit stream to produce codewords based on the first bit stream;
a differential and/or amplitude encoder that produces secondary symbols based on a second bit stream;
a first modulator that modulates the secondary symbols onto the codewords to produce modified codewords;
a second modulator that modulates a carrier wave according to the modified codewords;
a processor that receives the modulated carrier wave and produces a data stream therefrom;
a correlator that correlates the data stream to a set of codewords to produce correlations;
a block code detector that detects the codewords from the set of codewords; and
a differential and/or amplitude detector that detects sign and/or amplitude changes in the correlations corresponding to the detected codewords to thereby detect the secondary symbols in the data stream.

33. A system according to claim 32 wherein the block code detector is a soft decision block code detector or a hard decision block code detector and wherein the differential and/or amplitude detector is a soft decision differential and/or amplitude detector or a hard decision differential and/or amplitude detector.

34. A system according to claim 32 wherein the block code detector detects the highest correlations to thereby detect the codewords from the set of codewords.

35. A system according to claim 32 wherein the differential and/or amplitude detector comprises:
   a delay unit that delays a correlation corresponding to a detected codeword; and
   a multiplier that multiplies components of the delayed correlation and the current correlation together to detect differentially encoded secondary symbols in the data stream.

36. A system according to claim 32 wherein the block encoder comprises a block encoder that encodes the first bit stream using an orthogonal code.

37. A system according to claim 32 wherein the block encoder comprises a block encoder that encodes the first bit stream using at least one of Nordstrom-Robinson, Reed Muller and Kerdock codes.

38. A system according to claim 32 wherein the differential and/or amplitude encoder is a differential encoder.

39. A system according to claim 32 wherein the second modulator modulates a carrier wave according to the modified codewords using at least one of direct-sequence spreading and offset QPSK modulation.

40. A digital communication system comprising:
   means for block encoding a first bit stream to produce codewords;
   means for differential and/or amplitude encoding a second bit stream to produce secondary symbols;
   means for modulating the codewords according to the secondary symbols to produce modified codewords;
   means for modulating a carrier wave according to the modified codewords;
   means for receiving the modulated carrier wave and for producing a data stream therefrom;
   means for correlating the data stream to a set of codewords to produce correlations;
   first means for detecting codewords that correspond to the first bit stream; and
   second means for detecting differential and/or amplitude encoded secondary symbols that correspond to the second bit stream.

41. A system according to claim 40 wherein the means for block encoding comprises means for block encoding the first bit stream using an orthogonal code.

42. A system according to claim 40 wherein the means for block encoding comprises means for block encoding the first bit stream using at least one of Nordstrom-Robinson, Reed Muller and Kerdock codes.

43. A system according to claim 40 wherein the means for differential and/or amplitude encoding is a differential encoder.

44. A system according to claim 40 wherein the means for modulating a carrier wave comprises means for modulating a carrier wave according to the modified codewords using at least one of direct-sequence spreading and offset QPSK modulation.

45. A system according to claim 40 wherein the first means for detecting comprises a soft decision block code detector or a hard decision block code detector and wherein the second means for detecting comprises a soft decision differential and/or amplitude detector or a hard decision differential and/or amplitude detector.

46. A system according to claim 40 wherein the first means for detecting comprises means detecting the highest correlations to thereby detect the codewords that correspond to the first bit stream.

47. A system according to claim 40 wherein the second means for detecting comprises:
   means for delaying a correlation corresponding to a detected codeword; and
   means for multiplying components of the delayed correlation and the current correlation together to detect differentially encoded secondary symbols in the data stream.

48. A digital communication method comprising the steps of:
   block encoding the first bit stream to produce codewords;
   differential and/or amplitude encoding the second bit stream to produce secondary symbols;
   modulating the codewords according to the secondary symbols to produce modified codewords;
   modulating a carrier wave according to the modified codewords;
   receiving the modulated carrier wave;
   producing a data stream from the received modulated carrier wave;
   correlating the data stream to a set of codewords to produce correlations;
   detecting codewords that correspond to the bit stream; and
   detecting sign and/or amplitude changes in the correlations corresponding to the detected codewords to thereby detect differential and/or amplitude encoded secondary symbols in the bit stream.

49. A method according to claim 48 wherein the step of block encoding comprises the step of block encoding the first bit stream using an orthogonal code.

50. A method according to claim 48 wherein the step of block encoding comprises the step of block encoding the first bit stream using at least one of Nordstrom-Robinson, Reed Muller and Kerdock codes.

51. A method according to claim 48 wherein the differential and/or amplitude encoding step comprises the step of differential encoding.

52. A method according to claim 48 wherein the step of modulating a carrier wave comprises the step of modulating a carrier wave according to the modified codewords using at least one of direct-sequence spreading and offset QPSK modulation.

53. A method according to claim 51 wherein the step of detecting codewords comprises the step of soft decision or hard decision detecting the codewords and wherein the step of detecting sign and/or amplitude changes comprises the step of soft detecting or hard detecting sign and/or amplitude changes.

54. A method according to claim 51 wherein the step of detecting codewords comprises the step of detecting the highest correlations to thereby detect the codewords that correspond to the first bit stream.

55. A method according to claim 51 wherein the step of detecting sign and/or amplitude changes comprises the steps of:
   delaying a correlation corresponding to a detected codeword; and
   multiplying components of the delayed correlation and the current correlation together to detect differentially encoded secondary symbols in the bit stream.

* * * * *